(12) United States Patent
McCraw et al.

(10) Patent No.: US 12,254,881 B2
(45) Date of Patent: *Mar. 18, 2025

(54) WORD SELECTION FOR NATURAL LANGUAGE INTERFACE

(71) Applicant: Amazon Technologies, Inc., Seattle, WA (US)

(72) Inventors: Andrew Starr McCraw, Aliso Viejo, CA (US); Sheena Yang, Redondo Beach, CA (US); Sampat Biswas, Irvine, CA (US); Ryan Summers, Tustin, CA (US); Michael Sean McPhillips, Arcadia, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,876

(22) Filed: Jun. 6, 2023

(65) Prior Publication Data

US 2023/0377574 A1 Nov. 23, 2023

Related U.S. Application Data

(63) Continuation of application No. 17/195,177, filed on Mar. 8, 2021, now Pat. No. 11,676,597, which is a (Continued)

(51) Int. Cl.
*G10L 15/22* (2006.01)
*G06F 40/247* (2020.01)
(Continued)

(52) U.S. Cl.
CPC ............ *G10L 15/22* (2013.01); *G06F 40/247* (2020.01); *G10L 15/1815* (2013.01); *G10L 15/30* (2013.01); *G10L 2015/223* (2013.01)

(58) Field of Classification Search
CPC ...... G06F 3/167; G06F 16/243; G06F 40/216; G06F 40/247; G06F 40/268; G06F 40/284; G06F 40/30; G06F 40/35; G06F 40/56; G06F 16/24522; G06F 16/9535; G06F 21/31; G06F 40/126; G06F 3/0484; G06F 8/10; G06F 11/3664; G06F 16/285; (Continued)

(56) References Cited

U.S. PATENT DOCUMENTS 7,403,971 B2 * 7/2008 Maehiro ................. A63F 13/70
704/8
9,678,947 B2 * 6/2017 Allen .................... G06F 40/247
(Continued)

*Primary Examiner* — Gerald Gauthier
(74) *Attorney, Agent, or Firm* — Pierce Atwood LLP

(57) ABSTRACT

Techniques for altering default language, in system outputs, with language included in system inputs are described. A system may determine a word(s) in user inputs, associated with a particular user identifier, correspond to but are not identical to a word(s) in system outputs. The system may store an association between the user identifier, the word(s) in the user inputs, and the word(s) in the system outputs. Thereafter, when the system is generates a response to a user input, the system may replace the word(s), traditionally in the system outputs, with the word(s) that was present in previous user inputs. Such processing may further be tailored to a natural language intent.

20 Claims, 15 Drawing Sheets

Related U.S. Application Data continuation of application No. 16/357,264, filed on Mar. 18, 2019, now Pat. No. 10,978,069.

(51) Int. Cl.
*G10L 15/18* (2013.01)
*G10L 15/30* (2013.01)

(58) Field of Classification Search
CPC ............. G06F 16/90335; G06F 40/137; G06F 40/205; G10L 13/00; G10L 15/16; G10L 15/1815; G10L 15/1822; G10L 15/22; G10L 15/30; G10L 2015/223; G10L 13/27; H04N 21/4532; H04N 21/8106; H04W 4/12; H04W 68/005; A63F 13/70; G06N 5/02; G06N 5/01; G06N 7/01; G06N 20/00; H04L 65/403; G01C 21/3608; G06Q 30/02
See application file for complete search history.

(56) References Cited

U.S. PATENT DOCUMENTS

| | | | | |
|---|---|---|---|---|
| 9,805,018 | B1* | 10/2017 | Richfield | G06F 16/9535 |
| 9,854,324 | B1* | 12/2017 | Panchaksharaiah | H04N 21/8106 |
| 9,984,067 | B2* | 5/2018 | Visel | G06F 40/30 |
| 10,187,677 | B1* | 1/2019 | Panchaksharaiah | H04N 21/4532 |
| 10,318,586 | B1* | 6/2019 | Rose | G06F 16/285 |
| 10,664,759 | B2* | 5/2020 | Naik | G06F 40/30 |
| 10,978,069 | B1* | 4/2021 | McCraw | G10L 15/22 |
| 11,132,994 | B1* | 9/2021 | Zhou | G06F 40/30 |
| 11,430,435 | B1* | 8/2022 | Kahan | G10L 15/1822 |
| 11,651,239 | B2* | 5/2023 | York | G06Q 30/02 707/728 |
| 11,676,597 | B2* | 6/2023 | McCraw | G06F 40/30 704/235 |
| 11,699,441 | B2* | 7/2023 | Kockerbeck | G10L 15/22 704/257 |
| 2008/0033720 | A1* | 2/2008 | Kankar | G10L 15/1822 704/235 |
| 2009/0063557 | A1* | 3/2009 | MacPherson | G06N 5/02 |
| 2012/0221975 | A1* | 8/2012 | Juristovski | H04L 65/403 715/823 |
| 2013/0268260 | A1* | 10/2013 | Lundberg | G06F 11/3664 704/8 |
| 2016/0357731 | A1* | 12/2016 | Zorzin | G06F 40/268 |
| 2017/0110114 | A1* | 4/2017 | Edelson | G06F 40/126 |
| 2017/0293679 | A1* | 10/2017 | Boguraev | G06N 5/01 |
| 2017/0316085 | A1* | 11/2017 | Gupta | G06F 16/243 |
| 2018/0060599 | A1* | 3/2018 | Horling | G06F 21/31 |
| 2018/0307724 | A1* | 10/2018 | Shamsi | G06F 16/24522 |
| 2018/0322418 | A1* | 11/2018 | Jayaraman | G06N 7/01 |
| 2019/0130900 | A1* | 5/2019 | Tsai | G10L 13/00 |
| 2019/0332664 | A1* | 10/2019 | O'Neill | G06F 40/137 |
| 2019/0370669 | A1* | 12/2019 | Pais | G06F 16/90335 |
| 2020/0051556 | A1* | 2/2020 | Gill | G06F 40/268 |
| 2020/0073639 | A1* | 3/2020 | Prasad | G06F 8/10 |
| 2020/0105245 | A1* | 4/2020 | Gupta | H04W 68/005 |
| 2020/0110779 | A1* | 4/2020 | Setlur | G06F 3/0484 |
| 2020/0117717 | A1* | 4/2020 | Ramamurti | G10L 15/16 |
| 2020/0143262 | A1* | 5/2020 | Khare | G06F 40/205 |
| 2020/0151254 | A1* | 5/2020 | Wohlwend | G06F 40/284 |
| 2020/0184992 | A1* | 6/2020 | Newell | G10L 15/22 |
| 2020/0258508 | A1* | 8/2020 | Aggarwal | G01C 21/3608 |
| 2020/0402125 | A1* | 12/2020 | Hu | G06F 40/284 |
| 2021/0082411 | A1* | 3/2021 | Yasa | G06F 40/30 |
| 2021/0103700 | A1* | 4/2021 | Toplyn | G06N 20/00 |
| 2021/0295834 | A1* | 9/2021 | McCraw | G06F 40/56 |
| 2023/0377574 | A1* | 11/2023 | McCraw | G06F 40/247 |
| 2024/0029739 | A1* | 1/2024 | Nadig | H04W 4/12 |
| 2024/0087560 | A1* | 3/2024 | Skobeltsyn | G10L 15/1822 |

* cited by examiner

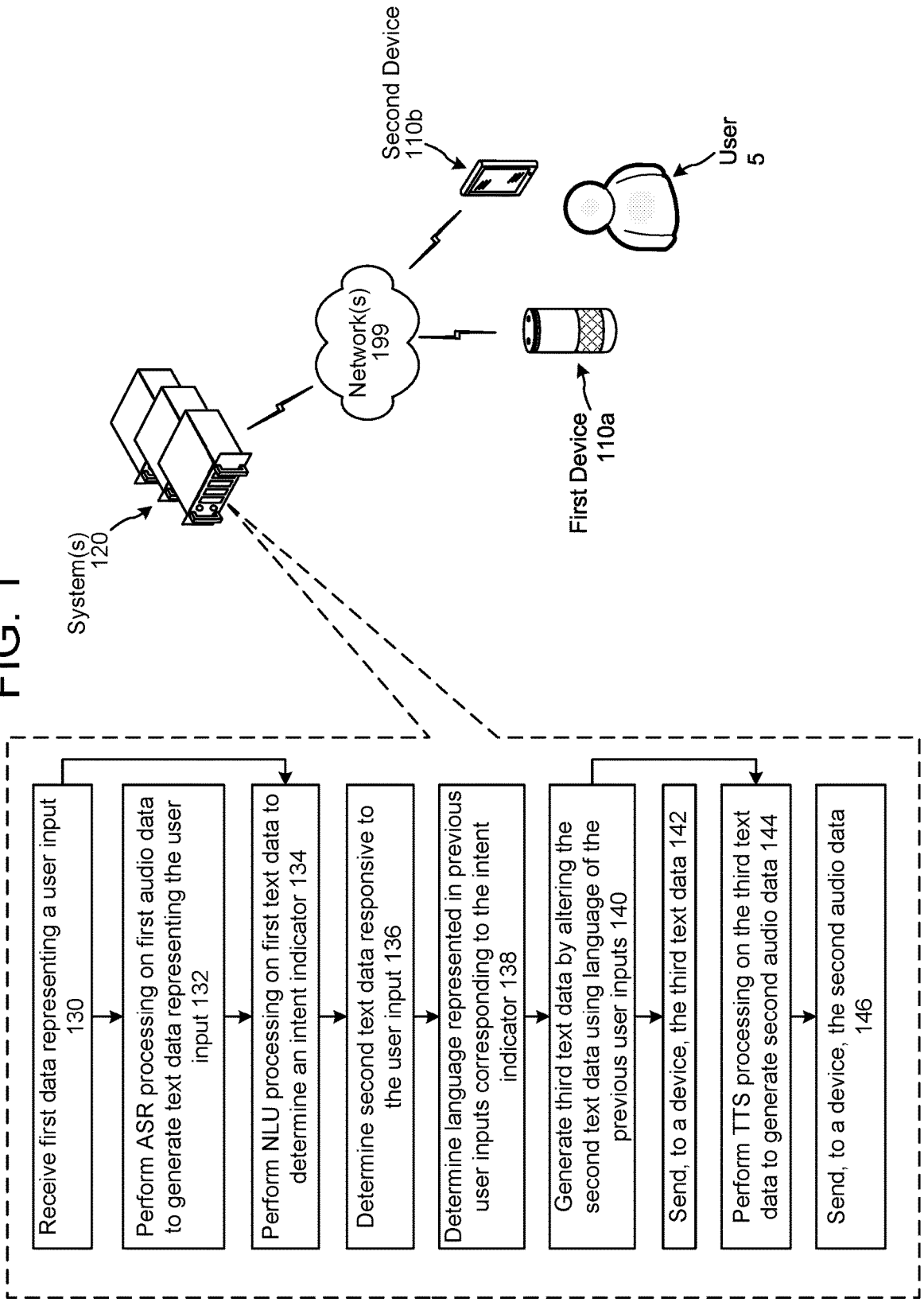

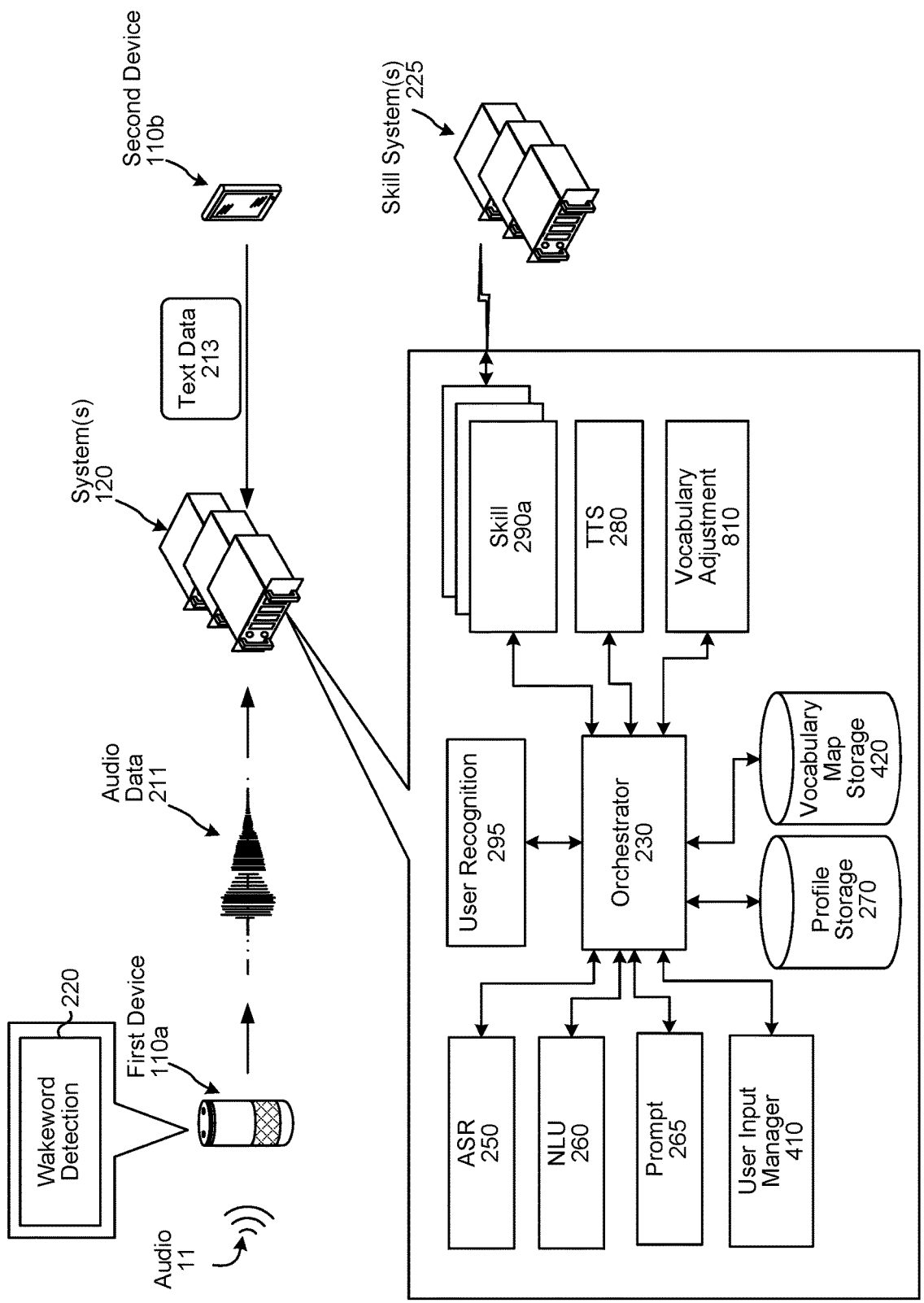

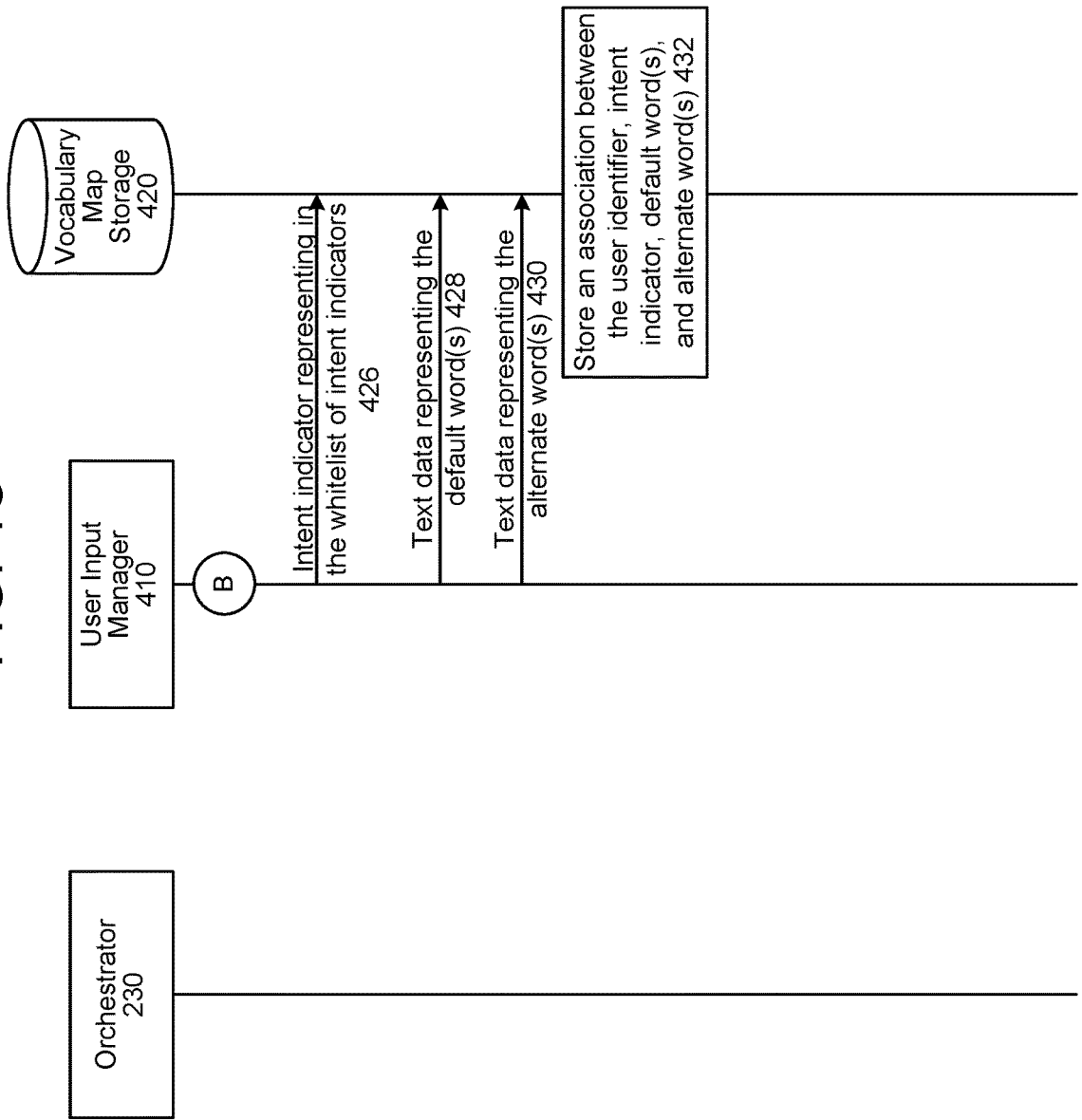

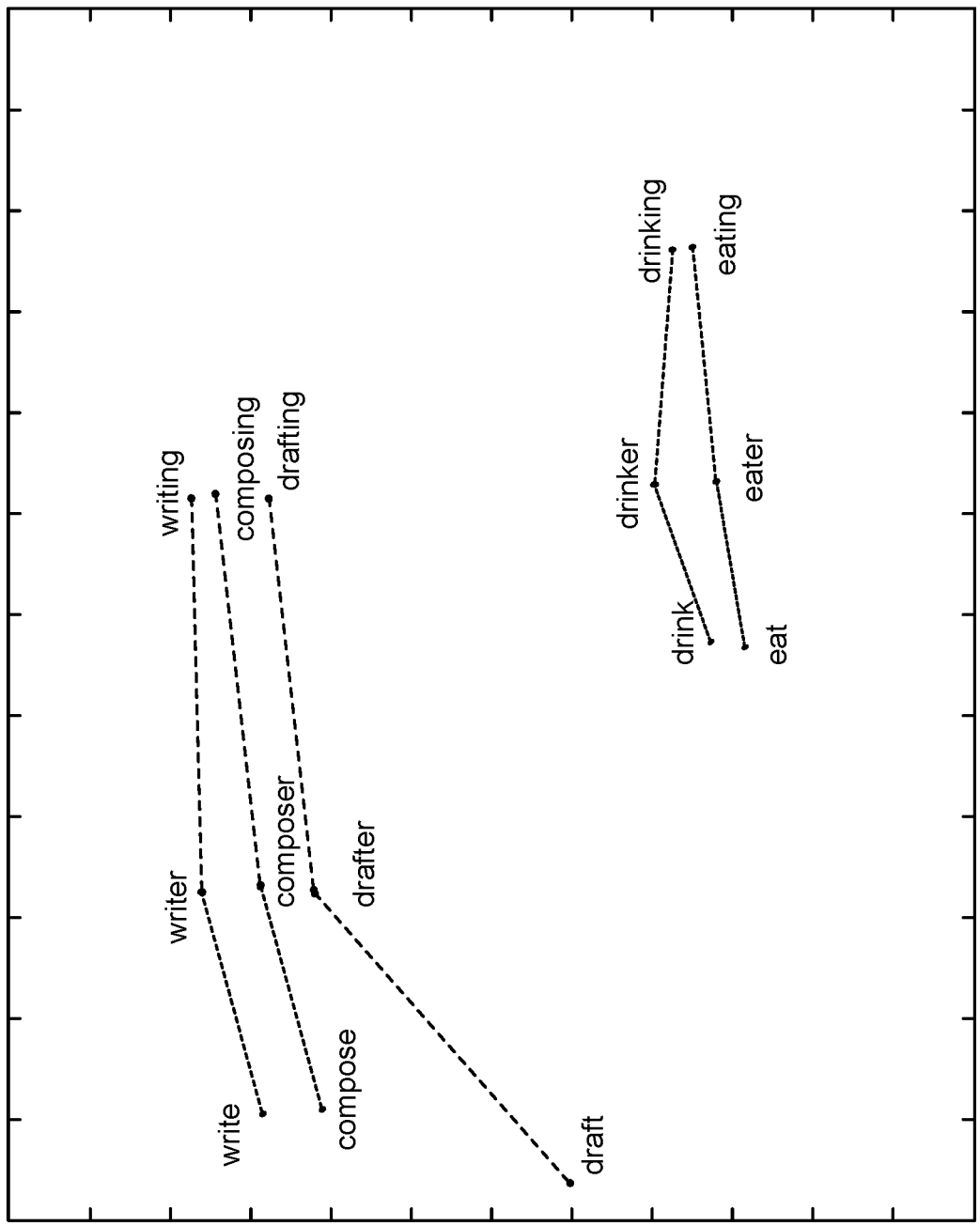

FIG. 6

| User Identifier | Intent Indicator | Default Word(s) | Alternate Word(s) | Percentage of Use | Time of Day Used | Acoustic Features |
|---|---|---|---|---|---|---|
| 1234 | <Confirmation> | Yes | Yeah | ----- | All day | Indicator 1 |
| 1234 | <Declination> | No | Nah | 65% | Morning | ----- |
| | | | Nope | 35% | Evening | Indicator 2 |
| 2345 | <Confirmation> | Yes | Yeah | 50% | All day | ----- |
| | | | Yup | 50% | Evening | ----- |
| 3456 | <Declination> | No | Nope | ----- | Morning | Indicator 3 |
| 3456 | <Disambiguation> | Thank you | It's fine | ----- | All day | ----- |
| 4567 | <Confirmation> | Yes | Sure thing | ----- | Afternoon | ----- |

Vocabulary Map Storage 420

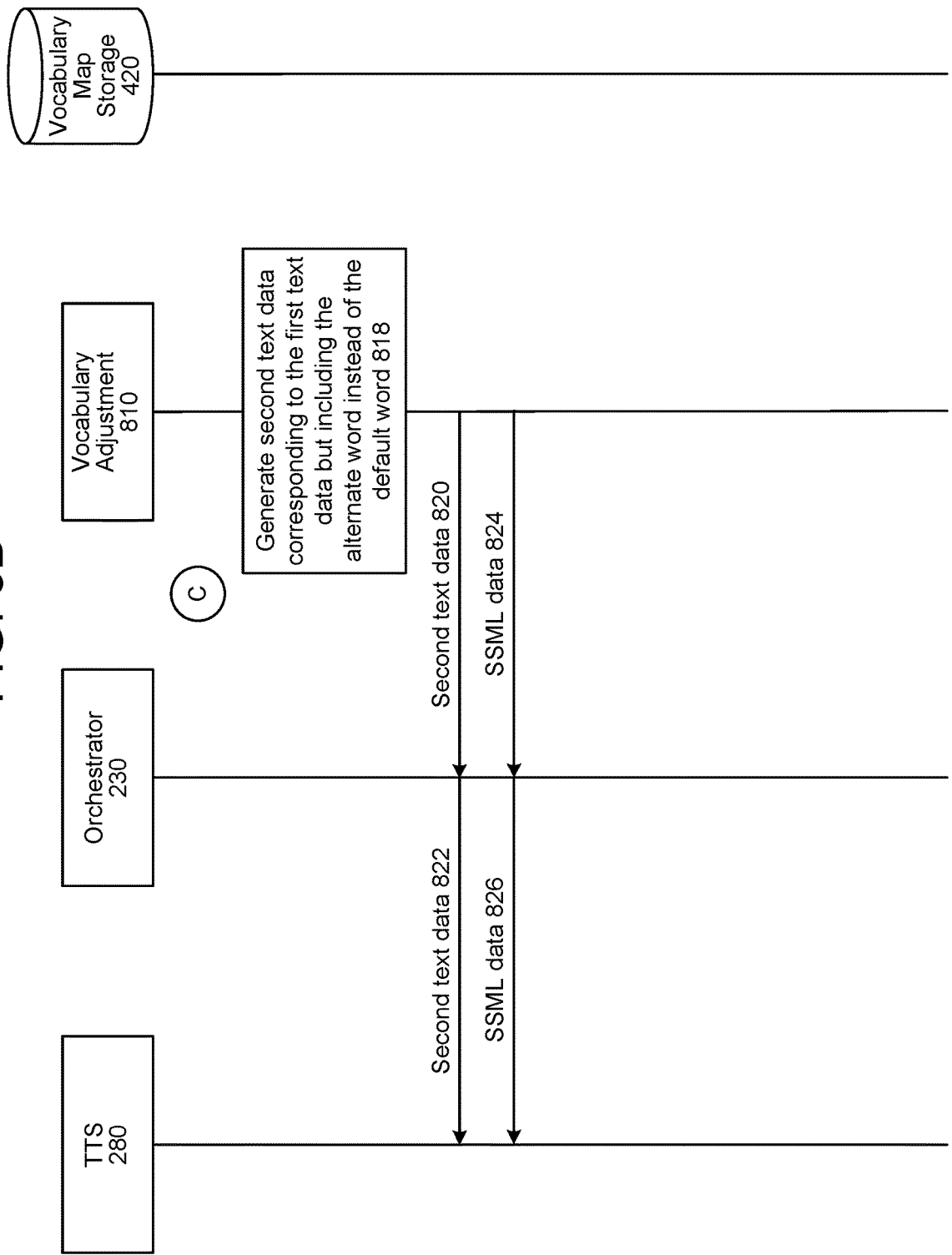

… (1) …

WORD SELECTION FOR NATURAL LANGUAGE INTERFACE

CROSS REFERENCE TO RELATED APPLICATION

This application is a continuation of, and claims priority to, U.S. Non-Provisional patent application Ser. No. 17/195,177, entitled "WORD SELECTION FOR NATURAL LANGUAGE INTERFACE," filed on Mar. 8, 2021, and scheduled to issue as U.S. Pat. No. 11,676,597, which is a continuation of U.S. Non-Provisional patent application Ser. No. 16/357,264, entitled "WORD SELECTION FOR NATURAL LANGUAGE INTERFACE," filed on Mar. 18, 2019, which issued as U.S. Pat. No. 10,978,069. The above applications are hereby incorporated by reference in their entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques, or otherwise processing audio data to determine a command, is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to alter default language in system outputs according to embodiments of the present disclosure.

FIG. 2 is a conceptual diagram illustrating components of a system according to embodiments of the present disclosure.

FIG. 3 is a schematic diagram illustrating an example architecture in which sensor data is combined to recognize one or more users according to embodiments of the present disclosure.

FIGS. 4A through 4C are a signal flow diagram illustrating how a user input map of alternate words may be generated according to embodiments of the present disclosure.

FIG. 5 illustrates representations of word usage similarity in a vector space according to embodiments of the present disclosure.

FIG. 6 is a conceptual diagram of data that may be stored in a vocabulary map storage according to embodiments of the present disclosure.

FIGS. 8A and 8B are a signal flow diagram illustrating an example of processing that may be performed to adjust a system(s) output to include an alternate word(s) according to embodiments of the present disclosure.

DETAILED DESCRIPTION

Figure 4A:
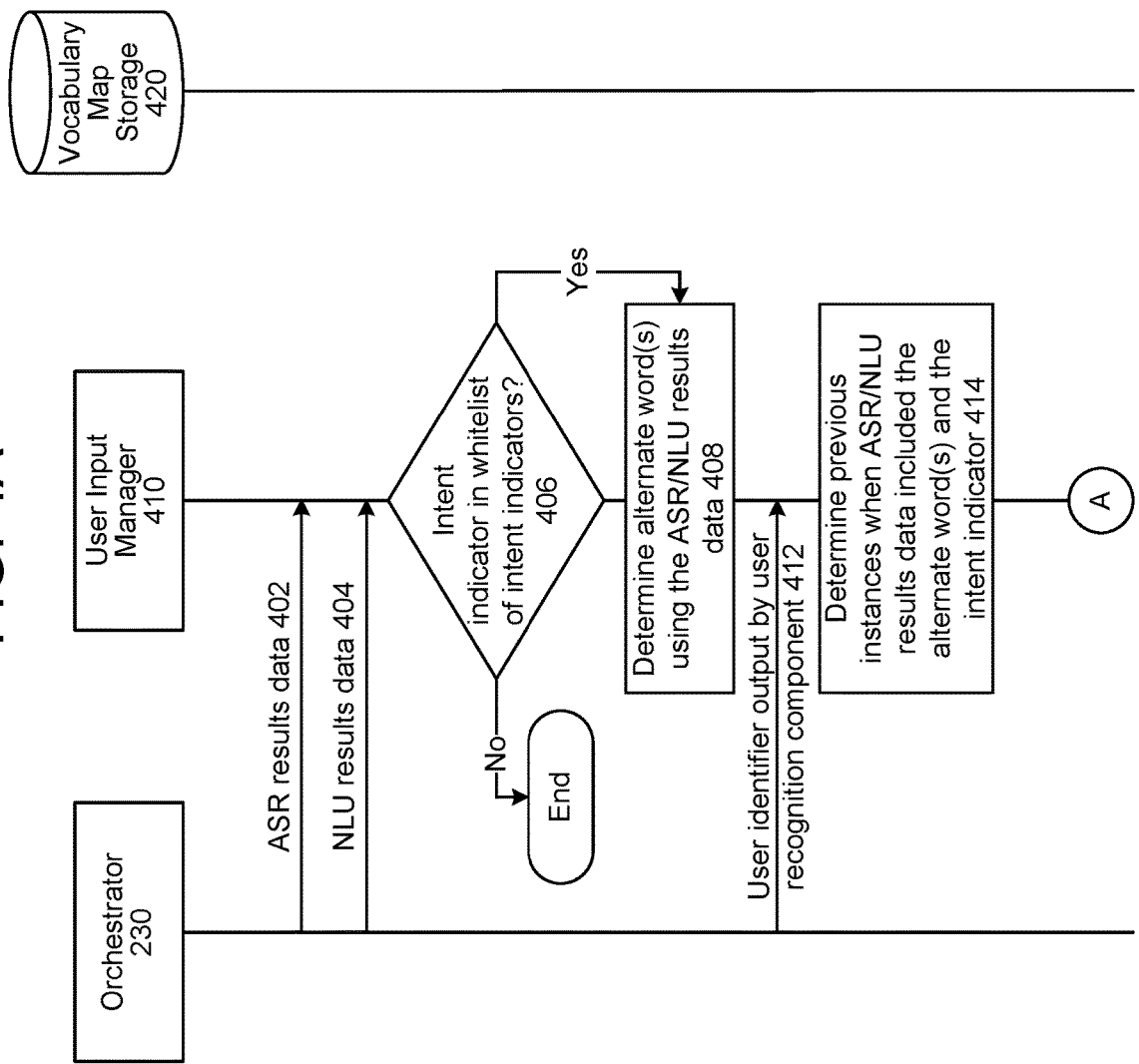

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A system may be configured to perform actions in response to spoken user inputs. For example, for the spoken user input of "Alexa, what time is it," a system may output synthesized (e.g., computer-generated) speech corresponding to a present time. For further example, for the spoken user input of "Alexa, what is the weather," a system may output synthesized speech corresponding to a weather for a geographic location corresponding to the user. In another example, for the user input of "Alexa, set a timer for 5 minutes," a system may set a digital timer for 5 minutes and output synthesized speech confirming setting of the timer.

A system may be configured to use default language when outputting synthesized speech, or presenting text, in response to a user input. For example, if a user input requests the system confirm something, a corresponding system response may include the word "yes" with or without other language. Or if a user input requests a time, the system may respond with a default recitation of the time, such as "it is twelve fifteen p.m." For further example, if a user inputs requests the system confirm something, a corresponding system response may include the word "no" with or without other language. In these examples, "yes" and "no" may be configured as default affirmative and negative outputs (respectfully) in response to confirmation requests. Default language may be output by the system regardless of the user that provided the user input.

The present disclosure enables such a system to alter default language when outputting synthesized speech or text to a user. Using the above as an example, the system may be defaulted to output "yes," but the system may change the output to "yeah," "yup," or the like, with or without other language, in certain situations. For further example, the system may be defaulted to output "no," but the system may instead output "nah," "nope," of the like, with or without other language, in certain situations. Such provides a more natural, human-like, less-robotic system, which may improve the user experience.

The system may alter default language based on what words a user has used in previous spoken user inputs. For example, if a user has previously used "yeah" in user inputs, the system may replace "yes" with "yeah" in system outputs intended for that user. For further example, if a user has previously used "nah" in user inputs, the system may replace "no" with "nah" in system outputs intended for that user. This will allow the system to customize outputs for particular users, situations, etc. in a way that provides a more desirable user experience.

Such altering of default language may be based on context. In an example, such context may refer to an NLU intent. For example, if a user has previously used "yeah" in user inputs corresponding to a first NLU intent, the system may replace "yes" with "yeah" in system outputs that are responsive to user inputs, of that user, corresponding to the first NLU intent. However, if a user has previously used "yeah" in user inputs corresponding to a first NLU intent, the system may not replace "yes" with "yeah" in system outputs that are responsive to user inputs, of that user, corresponding to a different NLU intent.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system configured to alter default language in system outputs. As illustrated in FIG. 1, a first device 110a, a second device 110b, and one or more systems 120 may be connected across one or more networks 199.

The first device 110a may receive audio, representing a spoken user input, via a voice user interface (VUI). The first device 110a may generate audio data representing the audio and may send the audio data to the system(s) 120, which the system(s) 120 receives (130). The second device 110b may receive a text-based user input via a graphical user interface (GUI). The second device 110b may generate text data representing the text-based user input and may send the text data to the system(s) 120, which the system(s) 120 receives (130). The device(s) (110a/110b) may send the audio data and/or text data to the system(s) 120 via a companion application installed on the device(s) (110a/110b). A companion application may enable a device 110 to communicate with the system(s) 120 via the network(s) 199. An example companion application is the Amazon Alexa application that may be installed on the smart phone, tablet, or the like.

If the system(s) 120 receives audio data at step 130, the system(s) 120 may perform (132) ASR processing on the audio data to generate text data representing the user input. The system(s) 120 may perform (134) NLU processing on first text data (either as received at step 130 or as generated at step 132) to determine an intent indicator. The intent indicator corresponds to the system(s) 120's interpretation of what the user 5 wants the system(s) 120 to perform. For example, an intent indicator of <OutputWeatherInformation> may correspond to the user input "Alexa, what is the weather." For further example, an intent indicator of <SetTimer> may correspond to the user input "Alexa, set a timer for 5 minutes." Other user inputs and corresponding intent indicators are possible.

The system(s) 120 may determine (136) second text data responsive to the user input. For example, for the user input of "Alexa, what is the weather," the system(s) 120 may determine second text data corresponding to "it is 35 degrees and sunny out." For further example, for the user inputs of "Alexa, what time is it," the system(s) 120 may determine second text data corresponding to "it is 3 pm." In another example, for the user inputs of "Alexa, set a 5 minute timer," the system(s) 120 may set an electronic timer for 5 minutes, and determine second text data corresponding to "timer set," "I have set a 5 minute timer," or the like.

The system(s) 120 may determine (138) language represented in previous user inputs, of the user 5, that correspond to the intent indicator determined at step 134. The system(s) 120 may perform user recognition processing (described in detail below) to determine a user identifier corresponding to the user 5. The system(s) 120 may determine previous user inputs associated with the user identifier and the intent indicator.

In at least some examples, the system(s) 120's ability to determine language represented in previous user inputs may be dependent on users' providing the system(s) 120 with access to previous natural language interactions and other historical information. Users may retain control of this information and delete it entirely, in which case the system(s) 120 may have limited functionality with respect to implementing some of what is described herein. Further, in at least some examples, this may be an opt-in feature and all user data may be encrypted for privacy.

The system(s) 120 may generate (140) third text data by altering the second text data, responsive to the NLU representation of the present user input, using language of the previous user inputs determined at step 138. For example, "yes," in the second text data, may be replaced with "yeah" if the previous user inputs used "yeah" where "yes" could have been used. For further example, "no," in the second text data, may be replaced with "nah" if the previous user inputs used "nah" where "no" could have been used. The third text data may include only the alternate word, or may include the alternate words along with other words (e.g., the alternate word may be included in a multi-word statement, question, etc.).

The alternate word(s) included in the third text data may be considered to be a reverse mapping of NLU processing. For example, a previous user input may include the word "yeah." NLU processing of the previous user input may generate NLU results data whereby "yeah" is replaced with "yes." At step 140, the system(s) 120 may perform the opposite mapping. That is, the system(s) 120 may replace "yes," in data representing a system(s) 120 output, with "yeah." Other examples are possible.

The system(s) 120 may send (142) the third text data to a device 110. The device 110 may display text, corresponding to the third text data, on a display of the device 110.

The system(s) 120 may additionally or alternatively perform (144) TTS processing on the third text data to generate audio data representing the third text data. The system(s) 120 may send (146) the audio data to a device 110. The device 110 may output audio, corresponding to the audio data, using one or more microphones associated with the device 110.

The device 110 referred to with respect to steps 142-146 may be the first device 110a, the second device 110b, or anther device 110 associated with a same user profile or group profile (as described in detail below).

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the first device 110a, captures audio. The first device 110a processes audio data, corresponding to the audio, to determine whether speech present. The first device 110a may use various techniques to determine whether audio data includes speech. In some examples, the first device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the first device 110a may implement a limited classifier configured to distinguish speech from background noise. The classifier may be implemented by techniques such as linear classifiers, support vector machines, and decision trees. In still other examples, the first device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the first device 110a detects speech in audio data, the first device 110a may use a wakeword detection component 220 to perform wakeword detection (e.g., to determine when a user intends to speak an input to the system(s) 120). An example wakeword is "Alexa."

Wakeword detection is typically performed without performing linguistic analysis, textual analysis, or semantic analysis. Instead, the wakeword detection component 220 analyzes the audio data to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may additionally or alternatively be used.

Once the wakeword detection component 220 detects a wakeword, the first device 110a may "wake" and begin transmitting audio data 211 to the system(s) 120. The audio data 211 may include data corresponding to the wakeword, or the first device 110a may remove the portion of the audio data 211 corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the overall system of the present disclosure, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The second device 110b may receive a text-based user input. The second device 110b may generate text data 213 representing the text-based user input. The second device 110b may send the text data 213 to the system(s) 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the first device 110a, the second device 110b, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. Such an intent may be represented by the intent indicator <PlayMusic>. For further example, if the text data corresponds to "what is the weather," the NLU component 260 may determine an intent that the system(s) 120 output weather information associated with a geographic position of the device 110. Such an intent may be represented as <OutputWeather>. The NLU component 260 may output NLU results data (which may include tagged text data, intent indicators, etc.).

As described above, the system(s) 120 may perform speech processing using two different components (e.g., the ASR component 250 and the NLU component 260). One skilled in the art will appreciate that the system(s) 120, in at least some implementations, may implement a spoken language understanding (SLU) component that is configured to process audio data 211 to generate NLU results data without necessarily determining interim text data.

In some examples, the SLU component may be equivalent to the ASR component 250 and the NLU component 260. For example, the SLU component may process audio data 211 and generate NLU data. The NLU data may include intent data and/or slot data so that directives may be determined based on the intent data and/or the slot data. While the SLU component may be equivalent to a combination of the ASR component 250 and the NLU component 260, the SLU component may process audio data 211 and directly generate the NLU data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive an intent or a desired action or operation from the user 5. In some examples, the SLU component outputs a most likely NLU response (e.g., hypothesis) recognized in the audio data 211, or multiple hypotheses in the form of a lattice or an N-best list with individual hypotheses corresponding to confidence scores or other scores (such as probability scores, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as a device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 225.

Unless expressly stated otherwise, reference to a skill, skill device, skill component, or the like herein may include a skill 290 operated by the system(s) 120 and/or operated by the skill system(s) 225. Moreover, the functionality described herein as a skill may be referred to using many different terms, such as an action, bot, app, or the like.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may include preferences of the user. Each user profile may include one or more device identifiers, representing one or more devices registered to the corresponding user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles (or two or more individual user identifiers). For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may include one or more user identifiers, corresponding to one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The system(s) 120 may include a prompt component 265. The prompt component 265 may include (or communicate with) a repository of prompts. As used herein, a "prompt" refers to pre-defined text data that may be output (as text or audio) in response to a user input. In some examples, a prompt may request further information in response to a user input. Each prompt may be associated with a different prompt identifier.

The system(s) 120 may include a user recognition component 295 that recognizes one or more users using a variety of data. As illustrated in FIG. 3, the user recognition component 295 may include one or more subcomponents including a vision component 308, an audio component 310, a biometric component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user the user recognition component 295 believes originated data input to the system(s) 120. The user recognition data 395 may be used to inform processes performed by various components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the system(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

The system(s) 120 may also include a user input manager 410 and a vocabulary map storage 420. The user input manager 410 may generate vocabulary mappings, which are stored in the vocabulary map storage 420 (as illustrated in FIGS. 4A through 4C).

As used herein, a "vocabulary mapping" refers to the storing of an association between a default output word(s) and an alternative word(s). A vocabulary mapping may also associate a user identifier or user profile identifier corresponding to a user or user profile for which the alternate word(s) may be used in lieu of the default output word(s). The vocabulary mapping may also associate an intent indicator identifying one or more intents or commands for which the alternate word(s) may be used in lieu of the default output word(s). By employing the vocabulary mapping strategy of the present disclosure, a system is able to have a limited set of default text for system outputs, but allow responses to user inputs to be customized to users, devices, contexts, regions, etc. without necessarily having to create entire separate default libraries for each user, device, context, region, etc. A vocabulary mapping can be as big or as small as is needed for each user. A vocabulary mapping may also be associated with one or more device identifiers; geographic location data; and/or other like data.

Figure 4B:
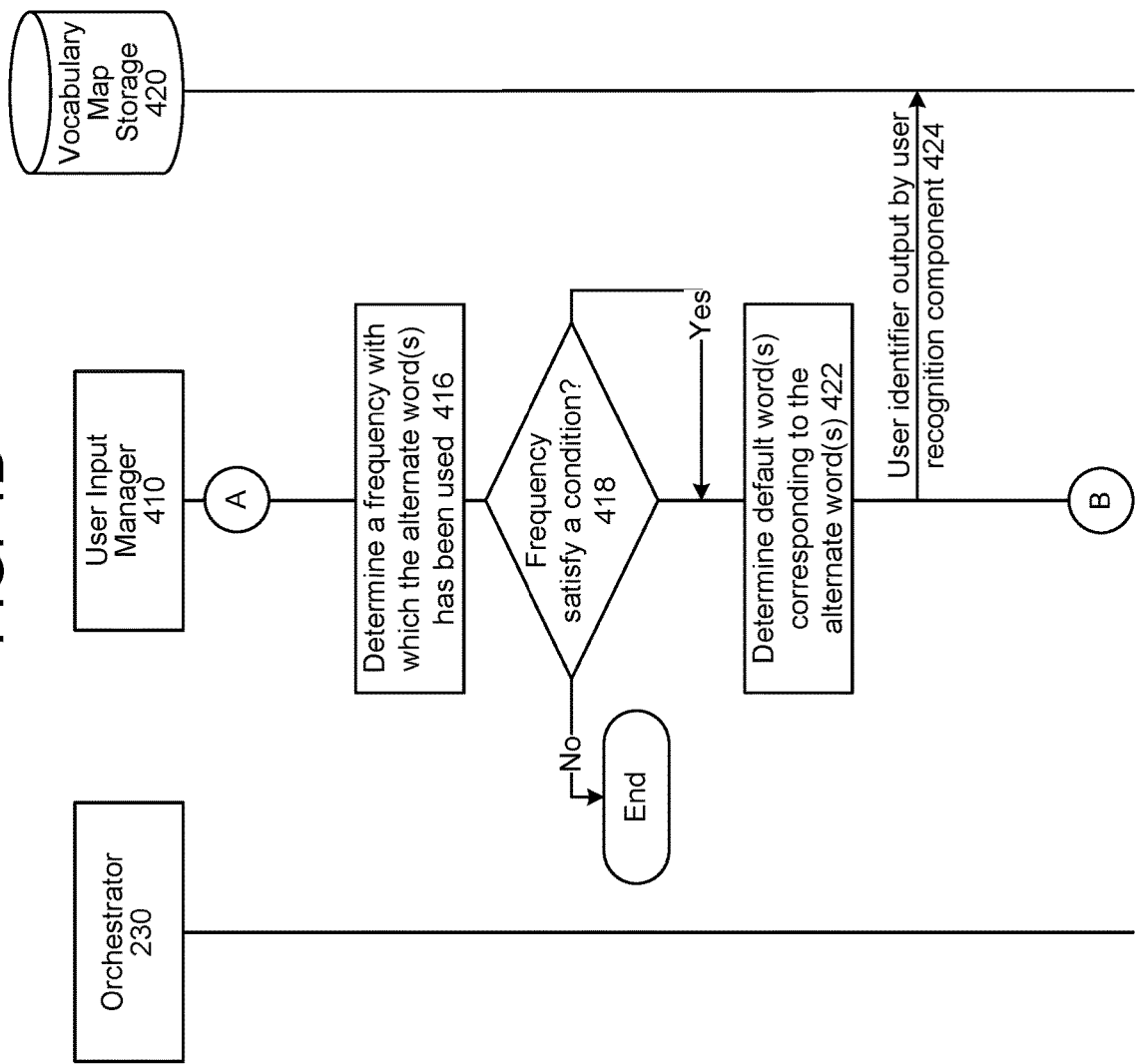

As illustrated in FIG. 4A, the orchestrator component 230 may send (402) ASR results data (generated by the ASR component in response to receiving audio data representing speech) to the user input manager 410. The orchestrator component 230 may also send (404) NLU results data (including tagged text, intent indicators, etc.) to the user input manager 410. Nonetheless, one skilled in the art will appreciate that the user input manager 410 may receive the ASR results data and/or the NLU results data from a component(s) of the system(s) 120 other than the orchestrator component 230.

The user input manager 410 may determine (406) whether an intent indicator, represented in the NLU results data, is represented in a whitelist of intent indicators. The whitelist of intent indicators may represent intents deemed appropriate for the system(s) 120 to alter language in corresponding outputs. For example, the whitelist of intent indicator may include a <Phatic> intent, representing the user input corresponds to the user's attempt to joke with the system(s) 120; a <Confirmation> intent, representing the user input corresponds to a confirmation of some fact or question output by the system(s) 120; a <Declination> intent, representing the user inputs corresponds to a declination of some fact or question output by the system(s) 120; a <Disambiguation> intent, representing the user input is providing clarity with respect to a previous user input; and/or one or more other intent indicators. Many other such intents/indicators may also be used.

If the user input manager 410 determines no intent indicator, represented in the NLU results data, is represented in the whitelist of intent indicators, the user input manager 410 may end processing.

If the user input manager 410 determines an intent indicator, represented in the NLU results data, is represented in the whitelist of intent indicators, the user input manager 410 may determine (408) an alternate word(s) using the ASR results data and/or the NLU results data. As used herein, an "alternate word(s)" refers to one or more words included in a user input that do not directly match one or more words expected by the system(s) 120.

For example, the user input manager 410 may be configured to know that the <Confirmation> intent is defaulted to be associated with the word "yes" (e.g., the system(s) 120 expects a user input corresponding to the <Confirmation> intent to include the word "yes"). However, the user input manager 410 may determine the ASR results data and/or NLU results data include the word "yeah." In this example, "yeah" would be determined to be the alternate word and "yes" would be determined to be the default word. The user input manager 410 could use word embedding (as described herein) to make such a determination. For example, knowing the words in the user input and the words expected for the intent, the user input manager 410 may use word embedding to determine a word(s) in the user input that is similar to a word(s) associated with the intent (e.g., in an NLU model). The determined word(s) in the user input may be considered an alternate word(s) and the related word(s) associated with the intent may be considered a default word(s).

In some instances, the NLU component 260 may be configured to change words in the ASR results data based on the determined intent indicator. For example, if the ASR results data includes the word "yeah" and the NLU component 260 determines the ASR results data corresponds to the <Confirmation> intent, the NLU component 260 may generate NLU results data whereby "yeah" is replaced with "yes." In this example, the user input manager 410 may determine "yeah" is an alternate word (and "yes" is a default word) based on the ASR results data including "yeah" but the NLU results data instead including "yes."

As described above, the user input manager 410 may determine a single alternate word. In some situations, the user input manager 410 may determine more than one alternate word. Using the above as an example, rather than the ASR results data including the word "yeah," the ASR results data may include the words "sounds good," "sure thing," "right on," or the like. In such a situation, the user input manager 410 may determine "sounds good," "sure thing," "right on," etc. correspond to alternate words.

The user input manager 410 may receive (412) a user identifier output by the user recognition component 295, with the user identifier representing a most likely user that provides the user input. If the user recognition component 295 outputs multiple user identifiers, the user identifier received at step 412 may be the top scoring user identifier. The user input manager 410 may receive the user identifier from the orchestrator component 230, as illustrated in FIG. 4A, or may receive the user identifier from another component of the system(s) 120. For example, the user input manager 410 may receive the user identifier from the user recognition component 295, without the orchestrator component 230 acting as an intermediary.

The user input manager 410 may determine (414) previous instances when ASR results data and/or NLU results data included the alternate word(s) and the intent indicator (determined at step 406). The user input manager 410 may request, from a system usage history storage of the system(s) 120 (not illustrated), ASR results data and/or NLU results data associated with the user identifier. In some instances, the user input manager 410 may limit the request to only ASR results data and/or NLU results data generated within a past threshold amount of time (e.g., a past week, a past month, etc.). Moreover, the user input manager 410 may limit the request to only NLU results data including the intent indicator (determined at step 406), and ASR data that resulted in the generation of that/those NLU results data.

Using the ASR results data and/or NLU results data determined/received at step 414, the user input manager 410 may determine (416) a frequency with which the alternate word(s) was used. Each separate ASR results data and/or corresponding NLU results data determined/received at step 414 may be associated with a timestamp representing when audio data or text data representing a user input (e.g., that resulted in the generation of the ASR results data and corresponding NLU results data) was received by the system(s) 120.

The user input manager 410 may determine various types of frequencies. In an example, the user input manager 410 may determine a frequency representing a number of times the alternate word(s) was included in previous user inputs. To this end, the user input manager 410 may simply determine a number of different ASR results data/NLU results data pairings determined/received at step 414.

In another example, the user input manager 410 may determine a frequency representing a number of times the alternate word(s) was included in previous user inputs within a past threshold amount of time. The user input manager 410 may calculate such a frequency in a number of ways. In a first way, the user input manager 410 may request (at step 414) ASR results data and/or NLU results data associated with timestamps corresponding to a past time and newer. The user input manager 410 may then determine the number of different timestamps (with each timestamp corresponding to different ASR results data, different NLU results data, or a different ASR results data/NLU results data pairing) represented in the received data. This number of different timestamps may correspond to the frequency determined at step 416. In a second way, the user input manager 410 may request (at step 414) ASR results data and/or NLU results data associated with the user identifier received at step 412. The user input manager 410 may then determine a number of different timestamps, represented in the received data, that correspond to the past threshold amount of time. This number of different timestamps may correspond to the frequency determined at step 416.

The user input manager 410 may determine (418) whether the determined frequency satisfies a condition representing the user (corresponding to the user identifier received at step 412) has used the alternate word(s) a sufficient amount of times to justify the system(s) 120 altering system(s) 120 outputs to include the alternate word(s). In an example, the condition may be a threshold frequency value.

If the user input manager 410 determines the frequency (determined at step 416) does not satisfy the condition, the user input manager 410 may end processing.

If the user input manager 410 determines the frequency (determined at step 416) satisfies the condition, the user input manager 410 may determine (422) a default word(s) corresponding to the alternate word(s). The user input manager 410 may have access to intent indicators and corresponding default words. For example, the user input manager 410 may has access to data representing a <Confirmation> intent is associated with the default word "yes," a <Declination> intent is associated with the default word "no," etc. The user input manager 410 may determine a default word(s) associated with the intent indicator determined at step 406.

The user input manager 410 may be configured to use word embeddings in its operations. A word embedding is a representation of a word in the form of a multi-dimensional data vector, where each dimension represents some data point regarding the word, its usage, or other information about the word. To create word embeddings, a text corpus is obtained that represents how words are used. The text corpus may include information such as books, news content, internet articles, etc. The system then creates multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus, word embedding data, represented in the individual values of a word embedding data vector, may correspond to how the respective word is used in the corpus.

A number of known techniques for manipulating vectors in high dimensional (or other) vector space may be used to analyze vectors and compare vectors to each other. One example for representing and analyzing word usage characteristics as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as a geometric relationship between vectors. For example, FIG. 5 illustrates a number of words in a hypothetical vector space where each point represents a vector location for the particular word. Although illustrated as located in a two-dimensional graph for discussion purposes, the usage vectors for the words illustrated in FIG. 5 may be in a high dimensional space. Further, FIG. 5 is shown for example purposes only and the vector locations/relationships do not necessarily reflect a true graphing of the usage of the illustrated words.

As illustrated in FIG. 5, certain words that have similar meaning may be close to each other in the vector space (indicating a similarity of usage characteristics). Also, certain words that have different meanings may also be close to each other in the vector space (also indicating a similarity of usage characteristics). In the top portion of FIG. 5, the words "writer," "composer" and "drafter" are located near each other, indicating that those three words are used similarly in the word data used to generate the vectors of FIG. 5. Similarly, the words "writing," "composing" and "drafting" are also located near each other, also indicating that those three words are used similarly. The words "write," "compose," and "draft" are not as close in FIG. 5, with "draft" in particular being located farther away from "write" and "compose" than those words are to each other. This distance may be due to other uses of the word "draft" that may differ from "write" and "compose." For example, "draft" has a known noun form, where "write" and "compose" do not. And "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words in FIG. 5. Other, non-illustrated variations may also exist (such as "writes," "drafted," etc.) with their own vectors and usage relationships to other words.

Creating word embeddings may be an intensive process and thus a pre-trained word embedding system may be used. One such word embedding format is GloVe, mentioned above. Others include word2vec described in Distributed Representations of Words and Phrases and their Compositionality by Tomas Mikolov, Kai Chen, Greg Corrado, and Jeffrey Dean, published in 2013, fasttext described in Enriching Word Vectors with Subword Information by Piotr Bojanowski, Edouard Grave, Armand Joulin, and Tomas Mikolov in 2016, Skip-Thought Vectors by Ryan Kiros, Yukun Zhu, Ruslan Salakhutdinov, Richard S. Zemel, Antonio Torralba, Raquel Urtasun, Sanja Fidler, Quick-Thought Vectors/Quick-Thought loss techniques by Lajanugen Logeswaran and Honglak Lee, and other techniques.

The user input manager 410 may additionally determine the default word(s) based on it being a synonym of the alternate word(s). For example, the user input manager 410 may be in communication with a storage including word associations (e.g., synonyms, antonyms, etc.). Once the user input manager 410 knows the alternate word(s), the user input manager 410 may determines synonyms of the alternate word that are associated with the intent indicator determined at step 406.

Referring back to FIG. 4B, the user input manager 410 may send, to the vocabulary map storage 420, the user identifier received at step 412 (424), the intent indicator determined at step 406 (426), text data representing the default word(s) (428), and text data representing the alternate word(s) (430). Within the vocabulary map storage 420, an association between the user identifier, the text data representing the default(s) word, and the text data representing the alternate word may be stored (432).

In an example, the user input manager 410 may not perform at least steps 406 and 426. For example, the user input manager 410 may determine an alternate word(s) in a user input, determine previous instances when the alternate word was included in previous user inputs, determine the previous number of instances satisfy a condition (e.g., a threshold frequency), user word embedding to determine a default word(s) that is associated with the alternate word and that is included in system(s) 120 outputs, and store an association between the user identifier, the alternate word(s), and the default word(s). As such, one skilled in the art will appreciate that a vocabulary mapping, in the vocabulary map storage 420, need not be tied to a particular intent indicator.

The vocabulary map storage 420 may include various entries, with each entry including a user identifier, an intent indicator, a default word(s), and an alternate word(s) (as illustrated in FIG. 6). Additionally or alternative, the vocabulary map storage 420 may include one or more finite state transducers (FSTs). An FST is a data structure that may include nodes with branches. Each node may correspond to a different criteria that must be satisfied to access a downstream branch. In an example, each FST, stored by the vocabulary map storage 420, may be unique to a particular user identifier.

FST data may be a set of tables with one table corresponding to nodes, labels, and where those nodes point. Another table may correspond to paths between nodes, indicating a start node, end node, label (e.g., intent indicator, and score.

The user input manager 410 may be configured to compute percentages of use for alternate words when a user identifier is associated with a default word(s) that may be changed to more than one different alternate word(s). For example, as illustrated in FIG. 6, the user input manager 410 may determine that, for the user identifier 1234, user inputs corresponding to the <Declination> intent, and including an alternate word for the word "no," included the word "nah" 65% of the time and the word "nope" 35% of the time. For further example, as illustrated in FIG. 6, the user input manager 410 may determine that, for the user identifier 2345, user inputs corresponding to the <Confirmation> intent, and including an alternate word for the word "yes," included the word "yeah" 50% of the time and the word "yup" 50% of the time. These percentages may be used at runtime to determine which alternate word should be included in an output of the system(s) 120.

The user input manager 410 may be configured to compute a binned time of use for each alternate word. For example, as illustrated in FIG. 6, the user input manager 410 may determine that, for a particular user identifier and intent indicator, a particular alternate word is included in user inputs all day long, in the morning, in the evening, in the afternoon, or some other binned time of use. These times of use may be used at runtime to determine when a particular alternate word should be included in an output of the system(s) 120.

The user input manager 410 may determine the foregoing binned times in a variety of ways. In an example, the user input manager 410 may request, from a system usage history storage of the system(s) 120, ASR results data and/or NLU results data associated with a user identifier. The user input manager 410 may then identify ASR results data/NLU results data pairs that include NLU results data including a particular intent indicator. The user input manager 410 may then identify, from those ASR results data/NLU results data pairs, a subset of the pairs in which the user input included a particular alternate word(s) (e.g., "yeah" instead of "yes"). The user input manager 410 may then processing timestamps, associated with the subset of ASR results data/NLU results data pairs, to determine a binned time to which the timestamps correspond.

In some examples, the ASR results data, received by the user input manager 410 at step 402, may be associated with (or may include) an indicator representing acoustic features corresponding to the alternate word. That is, the indicator may represent how the user spoke the alternate word (e.g., with what inflection). The user input manager 410 may send the indicator to the vocabulary map storage 420. The indicator may be associated with the corresponding alternate word in the vocabulary map storage 420 (as illustrated in FIG. 6).

FIG. 6 illustrates that data in the vocabulary map storage 420 may be stored as one or more tables. Alternatively, the vocabulary map storage 420 may store a log of previous user inputs including alternate words. Each user input may be associated with metadata illustrated in FIG. 6 (as well as other metadata). Such storage provides greater flexibility at runtime to compute various values from the data in the vocabulary map storage 420.

Figure 7:
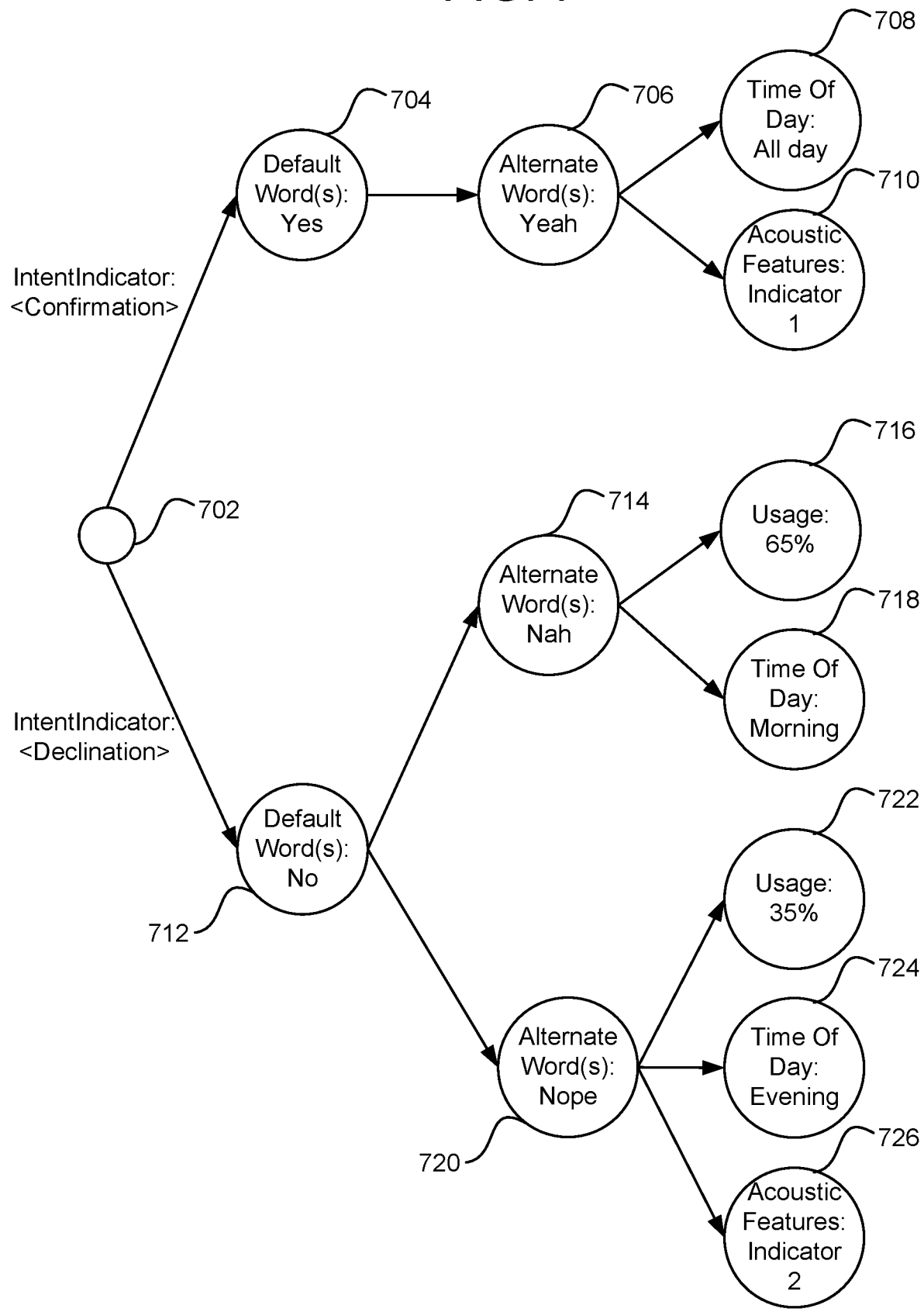
FIG. 7 is a conceptual diagram of an example finite state transducer (FST) according to embodiments of the present disclosure.

FIG. 7 illustrates a FST that may be generated for the user identifier 1234 entries illustrated in FIG. 6. One skilled in the art will understand, in view of FIG. 7, how to generate FSTs for various user identifiers and corresponding vocabulary map entries.

As illustrated in FIG. 7, a node 702 may correspond to a starting point of a FST for user identifier 1234. The node 702 includes two branches, one for the <Confirmation> intent and one for the <Declination> intent. The <Confirmation> intent branch leads to a node 704. To surpass the node 704, an output of the system(s) 120 (corresponding to a user input associated with the <Confirmation> intent) must include the word "yes." If the system(s) 120's output includes the word "yes," a node 706 may be reached. The node 706 represents the alternate word "yeah," meaning the word "yes" in the system(s) 120's output may be replaced with the word "yeah." The node 706 is associated with two other nodes, 708 and 710. Node 708 includes a time of day when "yeah" has been included in user inputs corresponding to the <Confirmation> intent. Node 710 includes an indicator of acoustic features, representing how "yeah" has be pronounced in previous user inputs corresponding to the <Confirmation> intent.

The <Declination> intent branch leads to a node 712. To surpass the node 712, an output of the system(s) 120 (corresponding to a user input associated with the <Declination> intent) must include the word "no." If the system(s) 120's output includes the word "no," two nodes 714 and 720 may be reached.

Node 714 represents the alternate word "nah," meaning the word "no" in the system(s) 120's output may be replaced with the word "nah." The node 714 is associated with two other nodes, 716 and 718. Node 716 includes a percentage representing how often "nah" was included in user inputs corresponding to the <Declination> intent. Node 718 includes a time of day when "nah" was included in user inputs corresponding to the <Declination> intent.

Node 720 represents the alternate word "nope," meaning the word "no" in the system(s) 120's output may be replaced with the word "nope." The node 720 is associated with three other nodes, 722, 724, and 726. Node 722 includes a percentage representing how often "nope" was included in user inputs corresponding to the <Declination> intent. Node 724 includes a time of day when "nope" was included in user inputs corresponding to the <Declination> intent. Node 726 includes an indicator of acoustic features, representing how "nope" has be pronounced in previous user inputs corresponding to the <Declination> intent.

One skilled in the art will appreciate that the types of data, represented in FIGS. 6 and 7, are not exhaustive, and that other types of data may be represented in a vocabulary mapping or FST. For example, context data may be included. Example context data includes one or more device identifiers, representing one or more devices 110 that captured previous user inputs including alternate words; geographic location data representing locations of devices 110 that captured previous user inputs including alternate words; and/or other like context data. This context data may be used at runtime for determining what alternate word(s) should be included in a system(s) 120 output.

While FIGS. 6 and 7 illustrated a vocabulary mapping include an intent indicator, a default word(s), and an alternate word(s), one skilled in the art will appreciate that a vocabulary mapping may include an intent indicator and alternate word(s), but not a default word(s).

The system(s) 120 may be configured to expand the alternate words, associated with a particular user identifier, based on alternate words spoken by other users of the system(s) 120 (e.g., users associated with different user identifiers). For example, a first user may include "yup" instead of "yes" in user inputs. Other users of the system(s) that include "yup" in user inputs may also include "yeah" in user inputs instead of "yes." Based on this, a vocabulary map associated with a user identifier of the first user (which may take on either for form illustrated in FIG. 6 or 7), may include the default word "yes," the alternate word "yup" based on previous user inputs of the first user (associated with the first user's identifier), as well as the alternate word "yeah" based on previous user inputs of the other user (e.g., associated with other user identifiers).

Figure 8A:
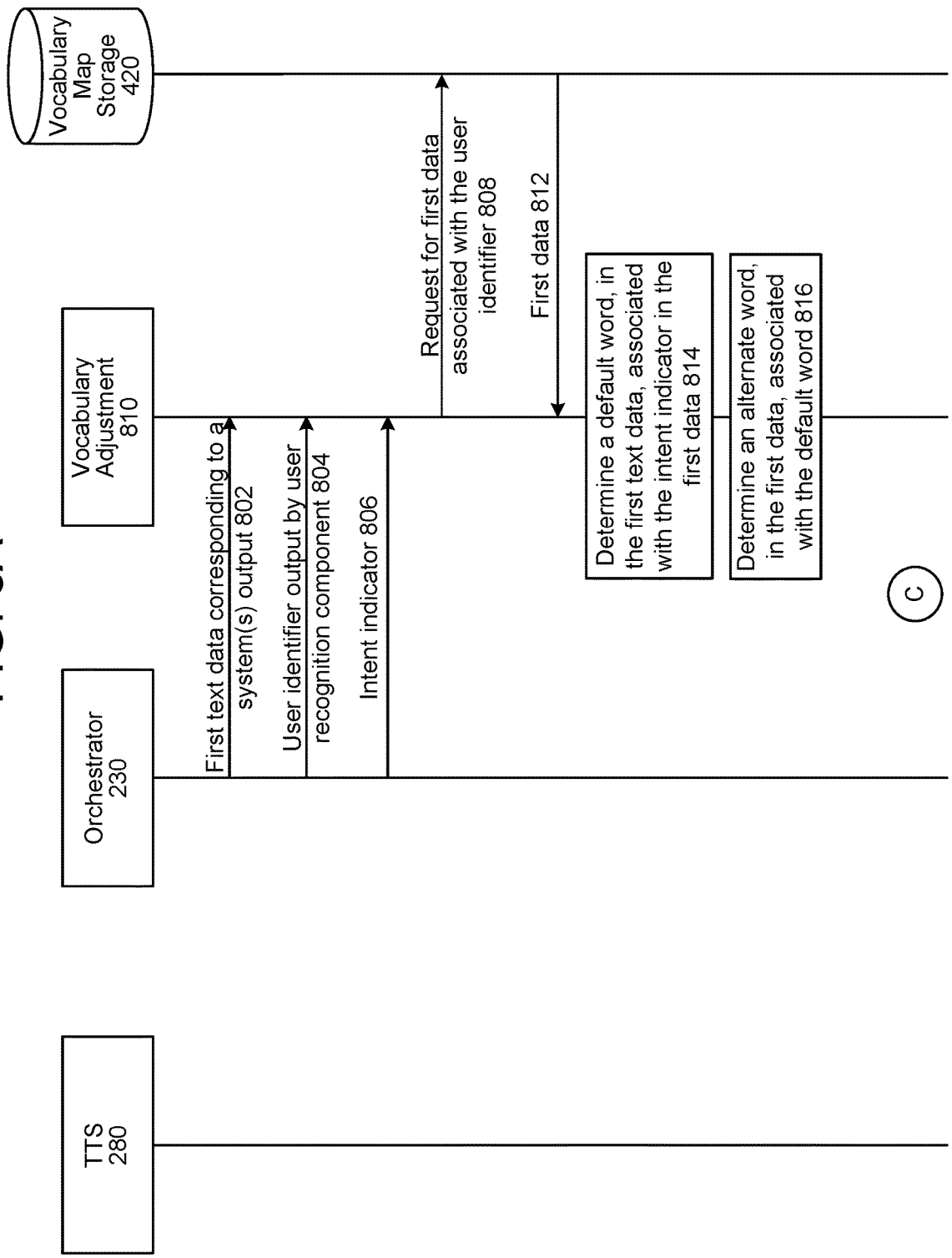

The data in the vocabulary map storage may be used at runtime to alter wording of system(s) 120 outputs. Certain system(s) 120s may implement a vocabulary adjustment component 810 configured to alter wording of data to be output as text (as illustrated in FIGS. 8A and 8B). The vocabulary adjustment component 810 may be implemented as a skill 290 in at least some system(s) 120.

The vocabulary adjustment component 810 may receive (802) text data corresponding to a system(s) 120 output that is associated with a corresponding user input. For example, if the user input corresponded to "what is the weather," the received text data may correspond to "it is eighty-five degrees outside with a high of eighty-seven degrees expected." For further example, if the user input corresponded to "set a timer for five minutes," the received text data may correspond to "a five minute timer has been set." Other user inputs and corresponding text data are possible. The vocabulary adjustment component 810 may receive the text data from the orchestrator component 230 (as illustrated), or may receive the text data from another component of the system(s) 120.

The vocabulary adjustment component 810 may receive (804) a user identifier output by the user recognition component 295 in association with the user input that resulted in the received text data being generated. The vocabulary adjustment component 810 may receive the user identifier from the orchestrator component 230 (as illustrated), or may receive the text data from another component of the system(s) 120. For example, the vocabulary adjustment component 810 may receive the user identifier from the user recognition component 295, without the orchestrator component 230 acting as an intermediary.

The vocabulary adjustment component 810 may receive (806) an intent indicator representing an intent of the user input that resulted in the received text data being generated. The vocabulary adjustment component 810 may receive the intent indicator as stand alone data, or the vocabulary adjustment component 810 may receive NLU results data including the intent indicator. The vocabulary adjustment component 810 may receive the intent indicator from the orchestrator component 230 (as illustrated), or may receive the intent indicator from another component of the system(s) 120. For example, the vocabulary adjustment component 810 may receive the intent indicator from the NLU component 260, without the orchestrator component 230 acting as an intermediary.

The vocabulary adjustment component 810 may request (808), from the vocabulary map storage 420, data associated with the user identifier, and may receive (812) the requested data. The data received at step 812 may be a text data structure, such as that illustrated for any given user identifier in FIG. 6. Additionally or alternative, the data received at step 812 may be a FST, such as that illustrated in FIG. 7.

The vocabulary adjustment component 810 may determine (814) determine a default word, in the text data received at step 802, associated with the intent indicator, received at step 806, in the data received at step 812. The vocabulary adjustment component 810 may determine (816) an alternate word associated with the default word in the data received at step 812.

The vocabulary adjustment component 810 may generate (818) text data corresponding to the text data received at step 802, but including the alternate word instead of the default word. The vocabulary adjustment component 810 may send (820) the generated text data to the orchestrator component 230 (or another component of the system(s) 120) for output to the user as text.

In some examples, the data received at step 812 may include data representing a time of day when the user (corresponding to the user identifier received at step 804) has included the alternate word in a previous user input(s). When the data, received at step 812, include this "time of day" data, the vocabulary adjustment component 810 may perform an additional check to ensure a present time of day corresponds to the time of day data. If the vocabulary adjustment component 810 determines the present time of day corresponds to the time of day data (e.g., the present time of day is the evening and the time of day data represents the evening), the vocabulary adjustment component 810 may generate the text data at step 818. Conversely, if the vocabulary adjustment component 810 determines the present time of day does not correspond to the time of day data (e.g., the present time of day is the evening and the time of day data represents the morning), the vocabulary adjustment component 810 may not generate the text data, and instead may simply output an indicator representing no alteration to the text data (received at step 802) is recommended.

In some situations, the vocabulary adjustment component 810 may determine the default word (determined at step 814) is associated with more than one alternate word (determined at step 816). Using FIGS. 6 and 7 as an example, the vocabulary adjustment component 810 may determine that the default word "no" corresponds to the alternate words "nah" and "nope." When this occurs, the vocabulary adjustment component 810 may use various techniques to determine exactly which alternate word should be included in the text data generated at step 818.

The vocabulary adjustment component 810 may determine the alternate word to include in the generated text data based at least in part on a time of day. For example and with reference to FIGS. 6 and 7, if the present time of day is the evening, the vocabulary adjustment component 810 may determine "nope" should be included, and not "nah."

Additionally or alternatively, the vocabulary adjustment component 810 may determine the alternate word to include in the generated text data based at least in part on a usage percentage. The data received at step 812 may include data representing a percentage of time that a first alternate word is used as compared to a second alternate word. Using FIGS. 6 and 7 as an example, the data received at step 812 may include data representing "nah" was included in user inputs 65% of the time and "nope" was included in user inputs 35% of the time. The vocabulary adjustment component 810 may be configured to include alternate words in generated text data at similar or same percentages as they were included in user inputs. Using the above as an example, with respect to generated text data that is to include either "nah" or nope," the vocabulary adjustment component 810 include "nah" in generated text data about 65% of the time and "nope" in generated text data bout 35% of the time.

There may be situations where the vocabulary adjustment component 810 determines the default word (determined at step 814) is associated with more than one alternate word (determined at step 816), but the data (received at step 812) does not include any data for guiding the vocabulary adjustment component 810's determination of which alternate word to use in the present situation. When this occurs, the vocabulary adjustment component 810 may randomly select one of the alternate words, and generate an indicator of such selection, which may be stored by the vocabulary map storage 420. Thereafter, when the vocabulary adjustment component 810 needs to select from among the same alternate words, the vocabulary adjustment component 810 may randomly select another of the alternate words that is not associated with such an indicator. The vocabulary adjustment component 810 may repeat this process until all alternate words have been selected, at which point the indicators may be deleted and the foregoing randomized selections may be repeated. Such processing enables the system(s) 120's outputs to appear less robotic, thereby improving the user experience, while the system(s) 120's outputs are nonetheless still critiqued to the user presently interacting with the system(s) 120.

As described above, there may be situations where a vocabulary mapping, in the vocabulary map storage 420, may not include an intent indicator. In such an example, the first data 812 may include one or more default words, one or more associated alternate words, and potentially other data, but may not include an intent indicator. When this occurs, the vocabulary adjustment component 810 may not perform step 814, per se. Instead, the vocabulary adjustment component 810 may determine a default word, in the first text data, that is represented in the first data, without respect to the intent indicator. The vocabulary adjustment component 810 may then continue with the processing illustrated in FIGS. 8A and 8B.

In some situations, the text data, generated by the vocabulary adjustment component 810, may be output as audio to a user. In such situations, the vocabulary adjustment component 810 may send (820) the text data, generated by the vocabulary adjustment component 810, to the orchestrator component 230, which may send (822) the text data to the TTS component 280. Alternatively, the vocabulary adjustment component 810 may send the text data to the TTS component 280, without the orchestrator component 230 acting as an intermediate.

The data, received from the vocabulary map storage 420 at step 812, may, in some examples, include data representing acoustic features, with the acoustic features representing how an alternate word was spoken in a previous user input. When the vocabulary adjustment component 810 includes the an alternate word, associated with acoustic features, in the text data generated at step 818, and the text data is to be output as audio by a device 110, the vocabulary adjustment component 810 may generate speech synthesis markup language (SSML) data or other data representing the acoustic features. The vocabulary adjustment component 810 may send (824) the SSML data to the orchestrator component 230, which may send (826) the SSML data to the TTS component 280. Alternatively, the vocabulary adjustment component 810 may send the SSML data to the TTS component 280, without the orchestrator component 230 acting as an intermediate. The TTS component 280 may use the SSML data to generate audio data representing the text data, whereby a portion of the audio data corresponding to the alternate word includes acoustic features similar or identical to those represented in the SSML data.

The system(s) 120 may include a prompt component 265. The prompt component 265 may be configured to provide pre-generated system(s) 120 outputs (referred to herein as a "prompt"). A prompt may not be specifically tailored to a corresponding user input. For example, whereas a tailored response to the user input "set a timer for five minutes" may be "a five minute timer has been set," a prompt, which may be output in response to the same user input, may be "a timer has been set." Other examples are possible. Each prompt may be associated with a different prompt identifier in a prompt storage 920 (which may be implemented by the system(s) 120 although not illustrated in FIG. 2).

Figure 9:
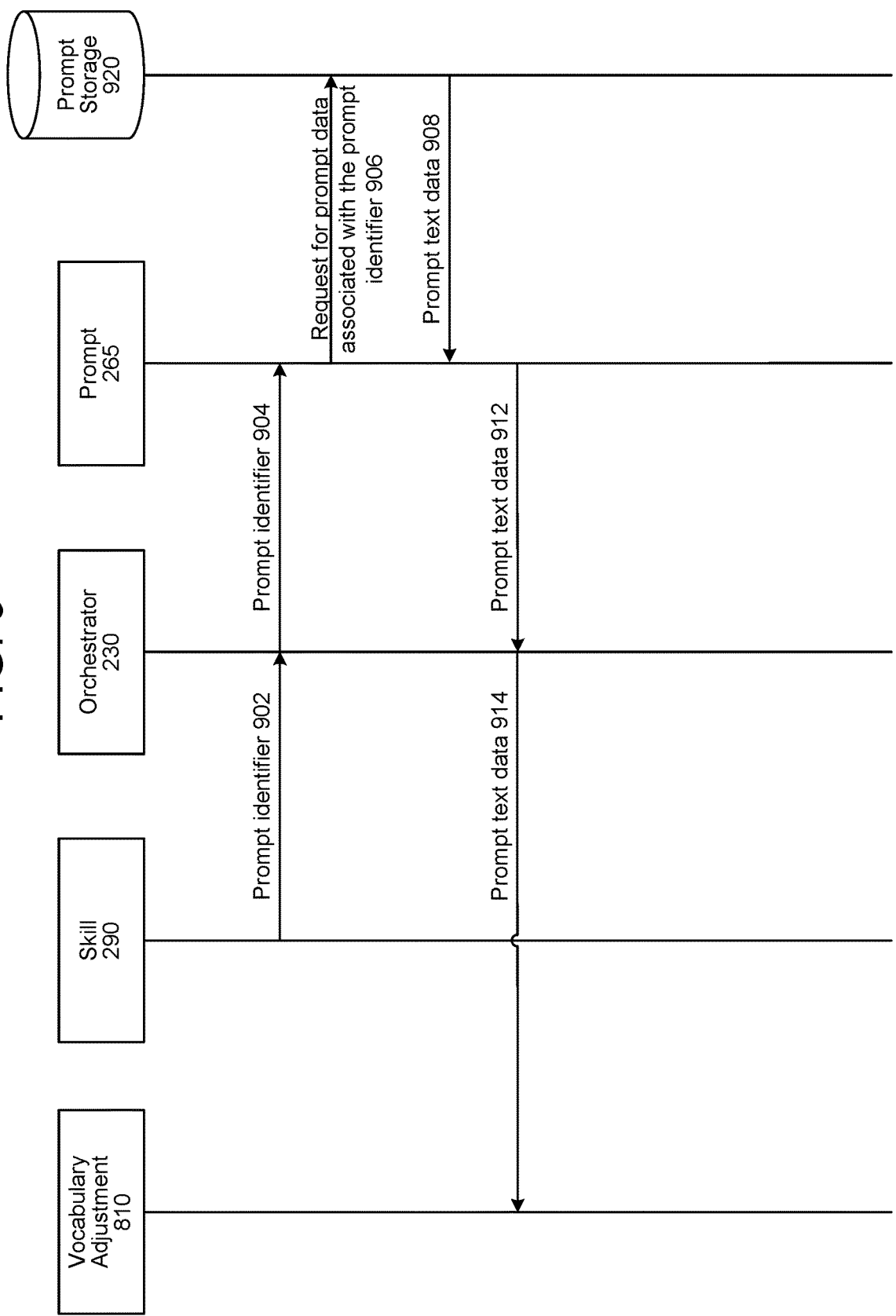
FIG. 9 is a signal flow diagram illustrating an example of processing that may be performed to invoke a vocabulary adjustment component according to embodiments of the present disclosure.

FIG. 9 illustrates how a prompt may be determined and altered to include an alternate word. A skill 290, or other component of the system(s) 120, may determine a prompt should be output in response to a user input. The skill 290, or other component, may send (902) a prompt identifier, corresponding to the prompt, to the orchestrator component 230, which may send (904) the prompt identifier to the prompt component 265. Alternatively, the skill 290, or other component, may send the prompt identifier to the prompt component 265, without the orchestrator component 230 acting as an intermediary.

The prompt component 265 may request (906), from the prompt storage 920, prompt data associated with the prompt identifier. In response, the prompt component 265 may receive (908) prompt text data.

The prompt component 265 may send (912) the prompt text data to the orchestrator component 230, which may send (914) the prompt text data to the vocabulary adjustment component 810. Alternatively, the prompt component 265 may send the prompt text data to the vocabulary adjustment component 810, without the orchestrator acting as an intermediary. This prompt text data may be the text data received by the vocabulary adjustment component 810 at step 802 in FIG. 8A. As a result, it will be appreciated that some or all of the processes, illustrated in and described with respect to FIGS. 8A and 8B, may be performed after the vocabulary adjustment component 810 receives the prompt text data.

Described above are techniques for the vocabulary adjustment component 810 to alter the wording of system(s) 120 outputs using stored vocabulary mappings and/or FSTs. The vocabulary adjustment component 810 may alternatively be a trained machine learning component configured to implement a model(s) for determining when to alter the wording of system(s) 120 outputs.

Various machine learning techniques may be used to train and operate models to perform various steps described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

For a given user input, inputs to the model(s) at runtime may include ASR results data, NLU results data, and one or more indicators representing one or more styles corresponding to previous user inputs associated with a user identifier output by the user recognition component 295.

The system(s) 120 may be configured to categorize previous user inputs into styles. Such categorizing may be performed on a user identifier basis. For example, the system(s) 120 may determine user inputs, corresponding to a first user identifier, correspond to a first style; user inputs, corresponding to a second user identifier, correspond to a second style; etc. In other examples, a user identifier may correspond to more than one style. Such style identifiers may be associated with user identifiers in the profile storage 270.

In an example, a style indicator may be associated with a particular context. For example, for a particular user identifier, a first style indicator may be associated with a first context corresponding to a first particular time of day, first particular geographic location information, a first device identifier, and/or other like data; a second style indicator may be associated with a second context corresponding to a second particular time of day, second particular geographic location information, a second device identifier, and/or other like data; etc.

Example styles include casual/informal, formal, polite, terse, conversational, etc. The casual/informal style may be associated with user input wording such as, for example, "sounds good," "cool," "dude," "no way", "yup," "yeah," "nah," "nope," etc. The formal style may be associated with user input wording such as, for example, "thank you," "that sounds wonderful," etc. The polite style may be associated with user input wording such as, for example, "please," "thank you," "would you like," etc. The terse style may be associated with user inputs having less than or equal to a threshold number of words (or that correspond to audio data having less than or equal to a threshold number of frames). The conversational style may be associated with user inputs having a number of words equal to or more than a threshold number of words (or that correspond to audio data having a number of frames equal to or exceeding a threshold number of frames). Other styles and corresponding criteria are possible.

The input to the model(s) may be a vector including various values, where each value corresponds to a different piece of data that could be input to the model individually.

Figure 10:
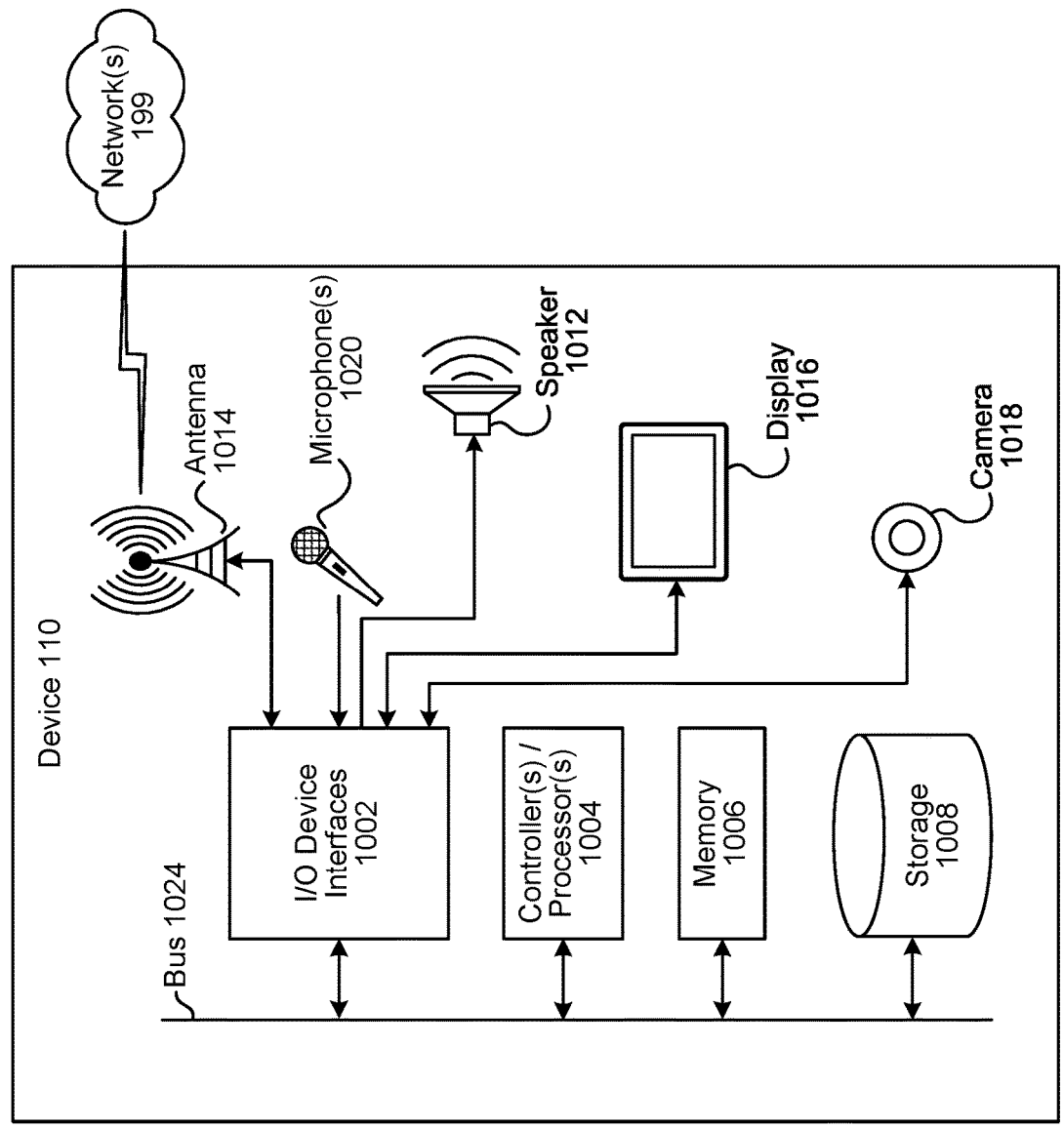
FIG. 10 is a block diagram illustrating example components of a device according to embodiments of the present disclosure.
Figure 11:
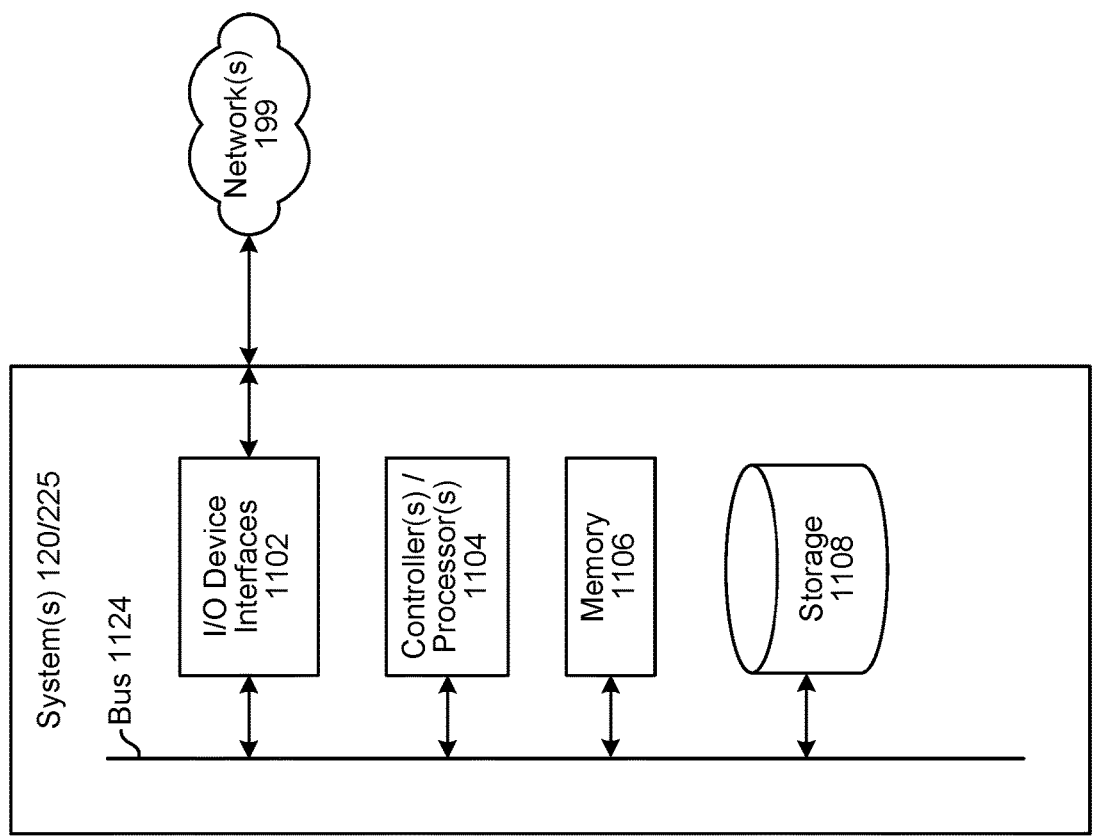
FIG. 11 is a block diagram illustrating example components of a server according to embodiments of the present disclosure.

FIG. 10 is a block diagram conceptually illustrating a device 110 that may be used with the system. FIG. 11 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225, etc. In operation, each of these systems may include computer-readable and computer-executable instructions that reside on the respective device (120/225), as will be discussed further below.

Each of these devices (110/120/225) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/225) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1002/1102).

Computer instructions for operating each device (110/120/225) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/225) includes input/output device interfaces (1002/1102). A variety of components may be connected through the input/output device interfaces (1002/1102), as will be discussed further below. Additionally, each device (110/120/225) may include an address/data bus (1024/1124) for conveying data among components of the respective device. Each component within a device (110/120/225) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1002/1102), processor(s) (1004/1104), memory (1006/1106), and/or storage (1008/1108) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 12:
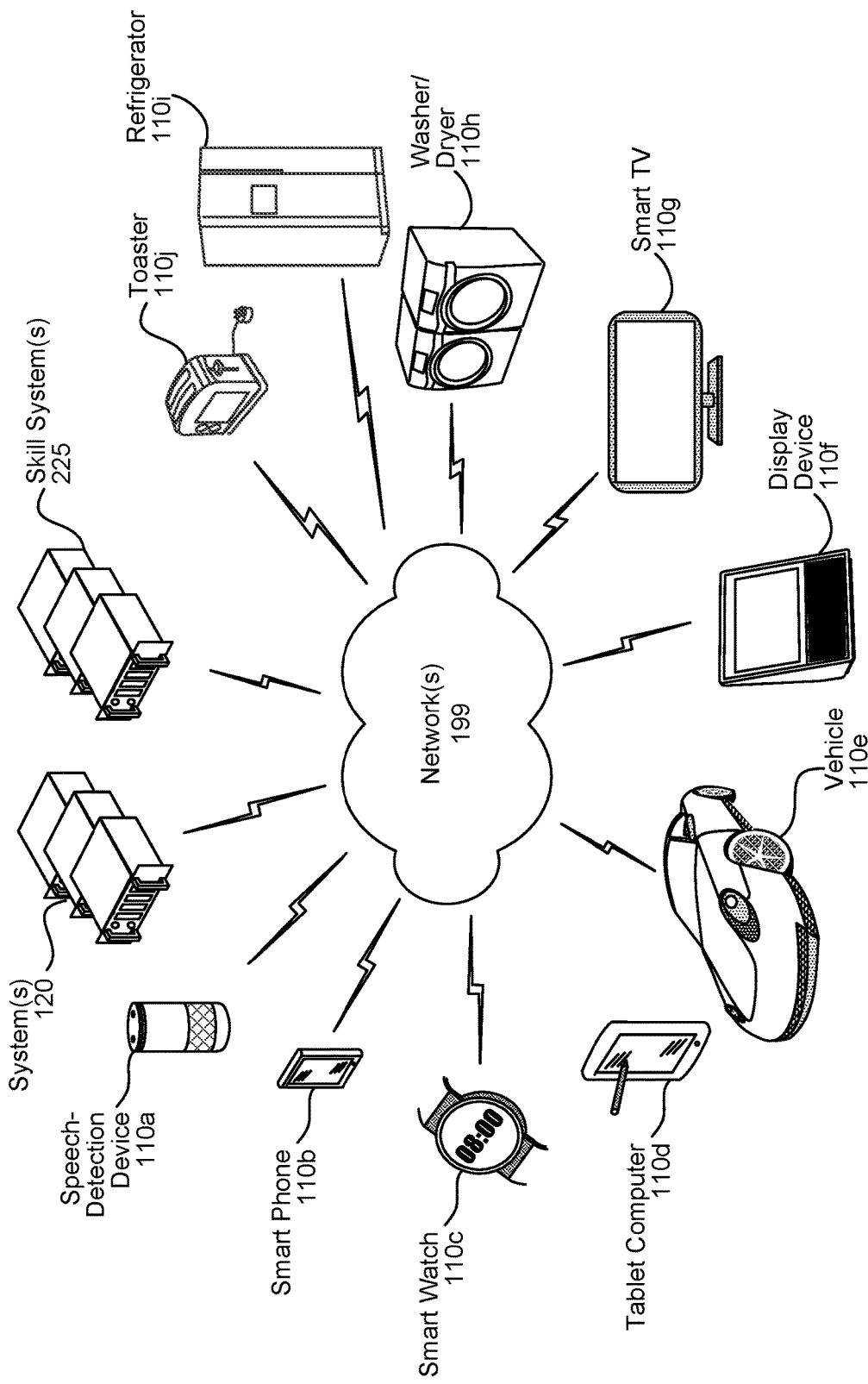
FIG. 12 is a conceptual diagram illustrating an example of a computer network for use with the speech processing system.

As illustrated in FIG. 12, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    determining first input data representing a natural language input;
    determining first data representing a meaning corresponding to a system response to the natural language input;
    determining, based at least in part on at least a first word included in the natural language input, second data representing a style;
    determining, based at least in part on the first data and the second data, a second word associated with the meaning and with the style; and
    generating first output data to be output as the system response including the second word.

2. The computer-implemented method of claim 1, further comprising:
    determining at least a third word included in the natural language input,
    wherein the second data is based at least in part on the third word.

3. The computer-implemented method of claim 1, further comprising:
    determining that the natural language input comprises a first number of words,
    wherein the second data is based at least in part on the first number of words.

4. The computer-implemented method of claim 1, further comprising:
    determining a user identifier corresponding to the natural language input,
    wherein the second data is based at least in part on the user identifier.

5. The computer-implemented method of claim 1, further comprising:
    determining third data corresponding to a previous natural language input received prior to the natural language input,
    wherein the second data is based at least in part on the third data.

6. The computer-implemented method of claim 1, wherein the natural language input comprises a text input.

7. The computer-implemented method of claim 1, further comprising:
    determining context data corresponding to the natural language input,
    wherein the second data is based at least in part on the context data.

8. The computer-implemented method of claim 1, wherein the first data corresponds to a skill invoked in response to the natural language input.

9. The computer-implemented method of claim 1, further comprising:
   determining third data corresponding to an audio output of the second word; and
   determining output audio data corresponding to synthesized speech of the system response using the first output data and the third data.

10. The computer-implemented method of claim 1, further comprising:
   determining third data representing word usage;
   determining a node of the third data corresponding to the first data; and
   determining the second word is associated with the node.

11. A system comprising:
   at least one processor; and
   at least one memory comprising instructions that, when executed by the at least one processor, cause the system to:
      determine first input data representing a natural language input;
      determine first data representing a meaning corresponding to a system response to the natural language input;
      determine, based at least in part on at least a first word included in the natural language input, second data representing a style;
      determine, based at least in part on the first data and the second data, a second word associated with the meaning and with the style; and
      generate first output data to be output as the system response including the second word.

12. The system of claim 11, wherein the at least one memory further comprises instructions that, when executed by the at least one processor, further cause the system to:
   determine at least a third word included in the natural language input,
   wherein the second data is based at least in part on the third word.

13. The system of claim 11, wherein the at least one memory further comprises instructions that, when executed by the at least one processor, further cause the system to:
   determine that the natural language input comprises a first number of words,
   wherein the second data is based at least in part on the first number of words.

14. The system of claim 11, wherein the at least one memory further comprises instructions that, when executed by the at least one processor, further cause the system to:
   determine a user identifier corresponding to the natural language input,
   wherein the second data is based at least in part on the user identifier.

15. The system of claim 11, wherein the at least one memory further comprises instructions that, when executed by the at least one processor, further cause the system to:
   determine third data corresponding to a previous natural language input received prior to the natural language input,
   wherein the second data is based at least in part on the third data.

16. The system of claim 11, wherein the natural language input comprises a text input.

17. The system of claim 11, wherein the at least one memory further comprises instructions that, when executed by the at least one processor, further cause the system to:
   determine context data corresponding to the natural language input,
   wherein the second data is based at least in part on the context data.

18. The system of claim 11, wherein the first data corresponds to a skill invoked in response to the natural language input.

19. The system of claim 11, wherein the at least one memory further comprises instructions that, when executed by the at least one processor, further cause the system to:
   determine third data corresponding to an audio output of the first word; and
   determine output audio data corresponding to synthesized speech of the system response using the first output data and the third data.

20. The system of claim 11, wherein the at least one memory further comprises instructions that, when executed by the at least one processor, further cause the system to:
   determine third data representing word usage;
   determine a node of the third data corresponding to the first data; and
   determine the second word is associated with the node.

* * * * *